(12) United States Patent
Webster et al.

(10) Patent No.: US 7,651,105 B2
(45) Date of Patent: Jan. 26, 2010

(54) HYDROFORMED STEERING KNUCKLE ASSEMBLY FOR VEHICLES AND METHOD OF MAKING SAME

(75) Inventors: James A. Webster, Washington Township, MI (US); Tomasz Warzecha, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 67 days.

(21) Appl. No.: 11/755,175

(22) Filed: May 30, 2007

(65) Prior Publication Data
US 2008/0296860 A1   Dec. 4, 2008

(51) Int. Cl.
*B62D 7/18* (2006.01)
(52) U.S. Cl. ............................ 280/93.512; 280/124.125; 280/124.126

(58) Field of Classification Search ............ 280/93.512, 280/781, 124.125, 124.126
See application file for complete search history.

(56) References Cited

U.S. PATENT DOCUMENTS

| 5,263,731 | A |   | 11/1993 | Deutschel |        |
|-----------|---|---|---------|-----------|--------|
| 5,799,524 | A | * | 9/1998  | Schafer et al. | 72/55 |
| 6,006,568 | A | * | 12/1999 | Bihrer    | 72/60  |
| 6,098,437 | A | * | 8/2000  | Kocer et al. | 72/55 |
| 6,394,472 | B1|   | 5/2002  | Graf et al. |       |
| 6,513,818 | B1| * | 2/2003  | Seuser et al. | 280/93.512 |

* cited by examiner

*Primary Examiner*—Toan C To

(57) ABSTRACT

A hydroformed steering knuckle assembly for a vehicle and method of making same includes a hydroformed main body. The hydroformed steering knuckle assembly also includes at least one component secured to the hydroformed main body. The hydroformed main body is a hydroformed monolithic structure being integral, unitary, and one-piece.

10 Claims, 3 Drawing Sheets

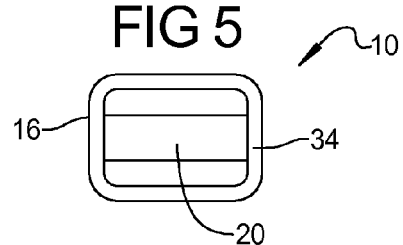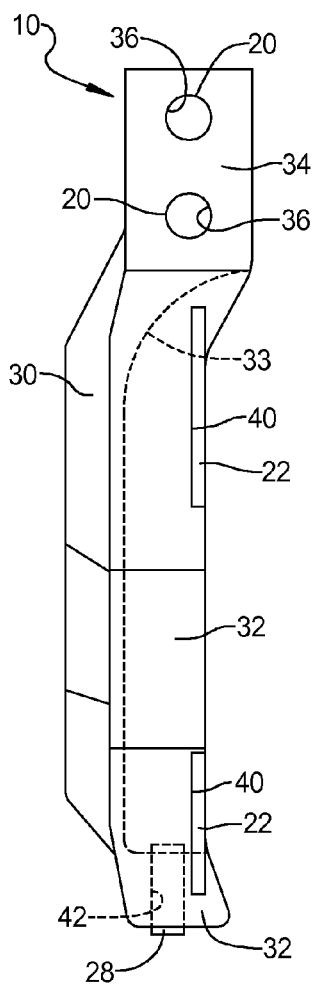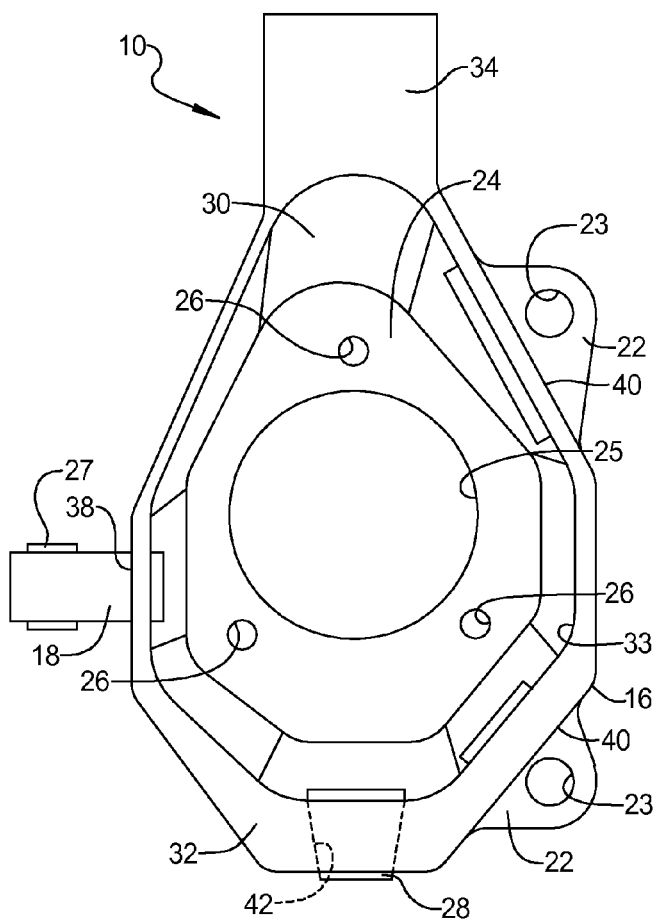

HYDROFORMED STEERING KNUCKLE ASSEMBLY FOR VEHICLES AND METHOD OF MAKING SAME

TECHNICAL FIELD

The present invention relates generally to hydroformed assemblies and, more particularly, to a hydroformed steering knuckle assembly for a vehicle and method of making same.

BACKGROUND OF THE INVENTION

It is known to provide a steering knuckle assembly for a vehicle such as an automotive vehicle. A typical steering knuckle assembly includes a hub for receiving a wheel bearing and a bracket connected to the hub for attachment to a steering arm of the vehicle. Typically, the hub is constructed out of multiple casted pieces of material such as cast iron or cast aluminum. These cast pieces have a relatively large mass and cost in fabrication and assembly.

It is also known to hydroform tubular components or members. Hydroformed tubular members are becoming increasingly popular in automotive body structural applications. During vehicle body manufacturing, many of the hydroformed tubular members are used in vehicle body and chassis applications.

As a result, it is desirable to provide a new steering knuckle assembly for a vehicle that reduces mass. It is also desirable to provide a new steering knuckle assembly for a vehicle that reduces overall cost in part fabrication and assembly. It is further desirable to provide a new method of making a steering knuckle assembly for a vehicle that eliminates multiple cast parts. Therefore, there is a need in the art to provide a new steering knuckle assembly and method of making same that meets at least one of these desires.

SUMMARY OF THE INVENTION

Accordingly, the present invention is a hydroformed steering knuckle assembly for a vehicle including a hydroformed main body. The hydroformed steering knuckle assembly also includes at least one component secured to the hydroformed main body. The hydroformed main body is a hydroformed monolithic structure being integral, unitary, and one-piece.

In addition, the present invention is a method of making a hydroformed steering knuckle assembly for a vehicle. The method includes the steps of providing a tubular member and at least one component member. The method also includes the steps of hydroforming the tubular member into a main body having a monolithic structure being integral, unitary, and one-piece. The method further includes the steps of securing the at least one component member to the hydroformed main body.

BRIEF DESCRIPTION OF THE DRAWINGS

FIG. 3 is a back elevational view of the hydroformed steering knuckle assembly of FIG. 1.

FIG. 4 is a side elevational view of the hydroformed steering knuckle assembly of FIG. 1.

FIG. 5 is a plan view of a portion of the hydroformed steering knuckle assembly of FIG. 1.

DESCRIPTION OF THE PREFERRED EMBODIMENT

Figure 1:
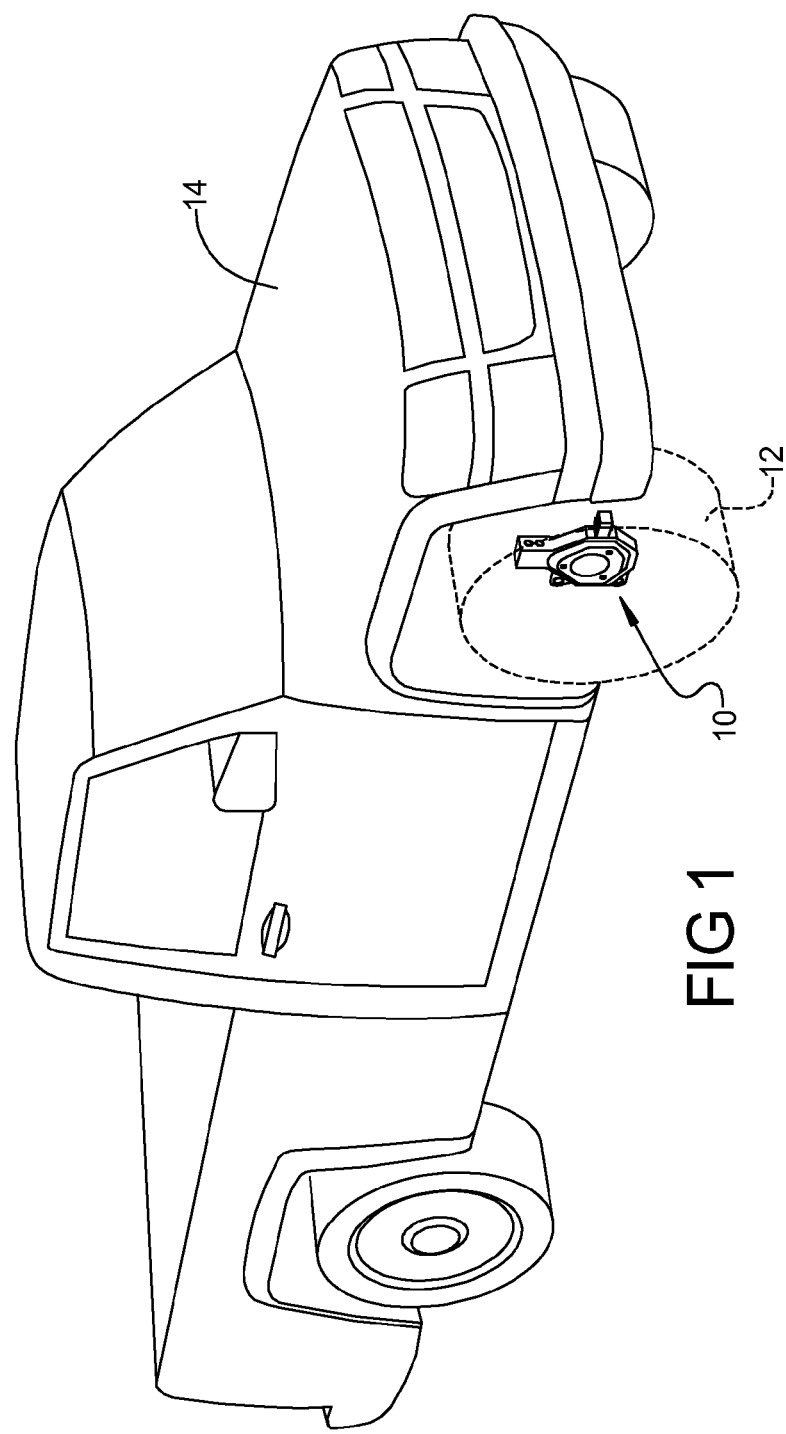
FIG. 1 is a perspective view of a hydroformed steering knuckle assembly, according to the present invention, illustrated in operational relationship with a vehicle.
Figure 2:
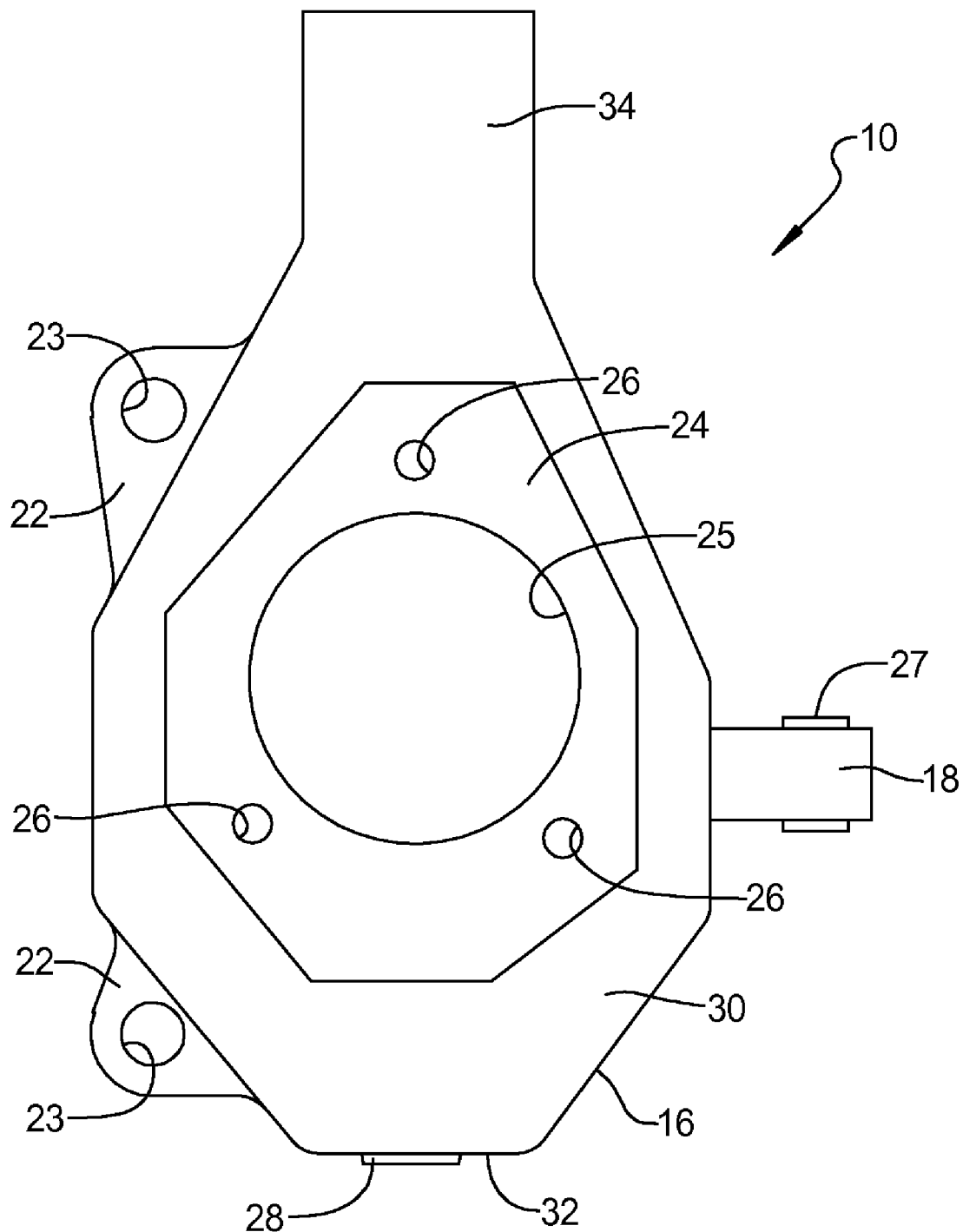
FIG. 2 is a front elevational view of the hydroformed steering knuckle assembly of FIG. 1.

Referring to the drawings and in particular FIG. 1, one embodiment of a hydroformed steering knuckle assembly 10, according to the present invention, is shown for a wheel 12 of a vehicle 14 such as an automotive vehicle. It should be appreciated that, except for the hydroformed steering knuckle assembly 10, the vehicle 14 is conventional and known in the art.

Referring to FIGS. 2 through 5, the hydroformed steering knuckle assembly 10 includes a main body 16 and at least one component, preferably a plurality of components secured to the main body 16. In the embodiment illustrated, the at least one component is a steering arm attachment 18 secured to the main body 16 by a suitable mechanism such as welding. The steering arm attachment 18 is a tubular member with a generally rectangular shape. The steering arm attachment 18 is made of a metal material.

The at least one component is also at least one, preferably a plurality of strut fastener attachments 20 for a strut (not shown) secured to the main body 16 by a suitable mechanism such as welding. Each of the strut fastener attachments 20 is a tubular member with a generally cylindrical shape. Each of the strut fastener attachment 20 is made of a metal material.

The at least one component is also at least one, preferably a plurality of caliper anchor plates 22 secured to the main body 16 by a suitable mechanism such as welding. Each of the caliper anchor plates 22 are a generally planar member. Each of the caliper anchor plates 22 have a bore 23 extending therethrough for attachment to a brake caliper (not shown). Each of the caliper anchor plates 22 is made of a metal material.

The at least one component is a bearing attachment 24 secured to the main body 16 by a suitable mechanism such as welding. The bearing attachment 24 is made from a flat or planar metal stock and welded to the main body 16. The bearing attachment 24 a plate having a circular opening 25 extending therethrough that serves for receiving a bearing (not shown) for a wheel axle (not shown). It should be appreciated that, on the circumference of the bearing attachment 24, at least one, preferably a plurality of pin bores 26 are spaced thereabout for fixing the wheel bearing.

The at least one component is also a steering arm ball joint attachment 27 secured to the main body 16 via the steering arm attachment 18 by a suitable mechanism such as welding. The steering arm ball joint attachment 27 is made from a metal slug, which is tapered and welded to the steering arm attachment 18. It should be appreciated that the steering arm ball joint attachment 27 is for attachment to a steering arm (not shown).

The at least one component is also a lower control arm ball joint attachment 28 secured to the main body 16 by a suitable mechanism such as welding. The lower control arm ball joint attachment 28 is made from a metal slug, which is tapered and welded to the main body 16. It should be appreciated that the lower control arm ball joint attachment 28 is for attachment to a lower control arm (not shown).

As illustrated in FIGS. 2 through 5, the main body 16 has an annular side wall 30 for receiving the bearing attachment 24. The side wall 30 extends axially. The main body 16 also has a base wall 32 extending laterally and longitudinally outward axially from the side wall 30. The main body 16 has a closed perimeter with a hollow interior 33 formed by the side wall 30 and base wall 32. The main body 16 has a bracket wall 34 extending longitudinally outwardly from the base wall 32. The bracket wall 34 is tubular and generally rectangular in shape. The bracket wall 34 has at least one, preferably a plurality of transverse bores 36 extending therethrough, which are aligned with the strut fastener attachments 20. It should be appreciated that the strut fastener attachments 20 are disposed within the interior of the bracket wall 34 and welded thereto for receiving pins (not shown) for fixing a telescopic strut (not shown).

The main body 16 has at least one, preferably a plurality of apertures extending through the base wall 32. In one embodiment, the main body 16 has a first aperture 38 extending laterally through a side of the base wall 32 to receive the steering arm attachment 18. The main body 16 also has at least one, preferably a plurality of second apertures 40 extending through the base wall 32 on a side opposite the first aperture 38 to receive the bearing attachments 22. The main body 16 has a third aperture 42 extending longitudinally through the base wall 32 at a location between the first aperture 38 and one of the second apertures 40 to receive the lower control arm ball joint attachment 28.

The main body 16 is made of a metal material with good elongation properties such as mild steel or aluminum. The main body 16 is formed by a hydroforming process, according to a method to be described. It should be appreciated that the main body 16 is a hydroformed monolithic structure being integral, unitary, and one-piece. It should also be appreciated that the main body 16 may be defined as having a hollow interior 33.

One embodiment of a method, according to the present invention, of making a hydroformed steering knuckle assembly 10 is disclosed. The method includes the step of providing a metal tubular member or blank. According to one method of hydroforming, the tubular blank is placed in a die set (not shown) comprised of an upper die half and a lower die half. The ends of the tubular blank are sealed and hydraulic fluid is pumped into the tubular blank under pressure. The upper die half and lower die half are progressively closed so that the tubular blank is progressively deformed and the pressurized fluid captured therein expands the walls of the tubular blank into cavity portions of the die halves.

Once the die is closed, the tubular blank is then expanded to a final cross-sectional profile by increasing the hydraulic pressure sufficient to exceed the yield limit of the tubular blank so that the tubular blank is forced into conformity with the cavity portions of the die halves. The die halves are then opened to permit removal of the finished hydroformed main body 16 from the die halves.

The method also includes the step of providing at least one component 18, 20, 22, 24, 26, and 28. The method further includes the step of securing the at least one component 18, 20, 22, 24, 26, and 28 and main body 16 together to form the hydroformed steering knuckle assembly 10. The securing involves welding the at least one component 18, 20, 22, 24, 26, and 28 to the main body 16 along an interface between the at least one component 18, 20, 22, 24, 26, and 28 and the base wall 32 of the main body 16. After hydroforming and welding, the hydroformed steering knuckle assembly 10 is machined and e-coated. It should be appreciated that the welding may be interrupted and/or continuous.

Accordingly, the present invention is a hydroformed steering knuckle assembly 10 for a vehicle 14, which eliminates traditional cast designs. The present invention is also a method of making a hydroformed steering knuckle assembly 10 for a vehicle 14, which reduces mass and cost. The hydroformed steering knuckle assembly 10 and method reduces part fabrication, material, and assembly cost. The hydroformed steering knuckle assembly 10 and method provides a one-piece hydroformed main body 16 that reduces complexity of the steering knuckle and provides an efficient structure for vehicle loading.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. An assembly adapted for use with a vehicle having at least one pivotal wheel and remainder non-pivotable vehicle structure, said assembly comprising:
   a steering knuckle including a hydroformed main body pivotally connectable to the structure, and interconnecting the structure and wheel, and at least one component secured to said hydroformed main body,
   wherein said body is a hydroformed monolithic structure being integral, unitary, and one-piece, and defines a hollow interior.

2. The assembly as set forth in claim 1 wherein said at least one component comprises at least one of a steering arm attachment, strut fastener attachment, caliper anchor plate attachment, bearing attachment, steering arm ball joint attachment, and lower control arm ball joint attachment.

3. The assembly as set forth in claim 1 wherein said hydroformed main body has at least one aperture extending therethrough to receive said at least one component.

4. The assembly as set forth in claim 1 wherein said hydroformed main body has a closed perimeter with a hollow interior.

5. The assembly as set forth in claim 1 wherein said hydroformed main body comprises a base wall, an annular side wall extending outwardly from said base wall, and a bracket wall extending longitudinally from said base wall.

6. The assembly as set forth in claim 5 including at least one weld to secure said at least one component to said hydroformed main body.

7. The assembly as set forth in claim 6 wherein said at least one weld joins said at least one component to a surface of said base wall of said hydroformed main body.

8. The assembly as set forth in claim 1 wherein said hydroformed main body is made of a metal material.

9. The assembly as set forth in claim 1 wherein said at least one component is made of a metal material.

10. An assembly adapted for use with a vehicle having at least one pivot wheel and remainder non-pivotable vehicle structure, said assembly comprising:
    a steering knuckle including a hydroformed main body pivotally connectable to the remainder vehicle structure, interconnecting the remainder and wheel, and including a base wall, an annular side wall extending outwardly from said base wall, and a bracket wall extending longitudinally from said base wall to form a closed perimeter having a hollow interior; and
    at least one component secured to said base wall of said hydroformed main body,
    wherein said hydroformed main body is a hydroformed monolithic structure being integral, unitary, and one-piece.

* * * * *